(12) United States Patent
Tanizawa (10) Patent No.: US 9,954,471 B2
(45) Date of Patent: Apr. 24, 2018

(54) MOTOR CONTROL UNIT

(71) Applicant: DENSO CORPORATION, Kariya, Aichi-pref. (JP)

(72) Inventor: Tomoya Tanizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/370,278

(22) Filed: Dec. 6, 2016

(65) Prior Publication Data

US 2017/0214345 A1  Jul. 27, 2017

(30) Foreign Application Priority Data

Jan. 27, 2016 (JP) .................. 2016-013715

(51) Int. Cl.
*H02P 7/29* (2016.01)
*H02P 7/03* (2016.01)

(52) U.S. Cl.
CPC . *H02P 7/29* (2013.01); *H02P 7/04* (2016.02)

(58) Field of Classification Search
CPC ..................................... H02P 7/29; H02P 7/04
See application file for complete search history.

(56) References Cited

U.S. PATENT DOCUMENTS

| 4,588,934 A * | 5/1986 | Suzuki | ....................... H02P 7/29 318/128 |
| 5,303,156 A * | 4/1994 | Matsuoka | ............ B62D 5/0487 180/404 |
| 5,374,857 A * | 12/1994 | Carobolante | ............. H02P 6/08 327/110 |
| 5,773,991 A * | 6/1998 | Chen | .................. G01R 19/0092 324/765.01 |
| 6,184,665 B1 * | 2/2001 | Salina | ....................... H02P 7/04 318/678 |
| 2009/0267544 A1* | 10/2009 | Lee | ......................... B60L 7/003 318/380 |

FOREIGN PATENT DOCUMENTS

| JP | 2001-305166 A | 10/2001 |
| JP | 2002-238290 A | 8/2002 |

* cited by examiner

*Primary Examiner* — Shawki S Ismail
*Assistant Examiner* — Muhammad S Islam
(74) *Attorney, Agent, or Firm* — Posz Law Group, PLC (57) ABSTRACT

A motor control unit includes an H-bridge circuit, a current detection part and a control part. The current detection part includes current detection resistors provided at both sides of a DC motor. The control part feedback-controls high-side arm switches and low-side arm switches of the H-bridge circuit so that a detection value of the current detection part follows a target value. In the feedback control, normal control and current circulation control are performed alternately. In the current circulation control, either the high-side arm switches or the low-side arm switches are turned on for both of normal rotation time and reverse rotation time. The control part performs the feedback control based on a detection value of the current detection resistor, which has the same potential reference between the normal control and the current circulation control under the same rotation direction.

3 Claims, 8 Drawing Sheets

MOTOR CONTROL UNIT

CROSS REFERENCE TO RELATED APPLICATION

This application is based on Japanese patent application No. 2016-13715 filed on Jan. 27, 2016, the whole contents of which are incorporated herein by reference.

FIELD

The present disclosure relates to a motor control unit, which includes an H-bridge circuit, a current detection part having current detection resistors and a control part for feedback-controlling switches of the H-bridge circuit so that a detection value of the current detection part follows a target value.

BACKGROUND

JP 2002-238290A discloses a motor control unit, which includes an H-bridge circuit, a current detection part having current detection resistors and a control part for feedback-controlling switches forming the H-bridge circuit so that a detection value of the current detection part follows a target value. The H-bridge circuit includes a high-side arm circuit and a low-side arm circuit. The high-side arm circuit is formed of two high-side arm switches connected in parallel to a power supply. The low-side arm circuit is formed of two low-side arm switches connected in parallel to a ground. One of the high-side arm switches and one of the low-side arm switches are connected in series at a first connection node. The other of the high-side arm switches and the other of the low-side arm switches are connected in series at a second connection node. The first connection node and the second connection node are connected electrically to a first terminal and a second terminal of a DC motor, respectively.

The control part alternately performs, as a feedback control, a normal control and a current circulation control. In the normal control, one of the high-side arm switches and one of the low-side arm switches are turned on at the same time so that a current flows from the power supply to the ground through the DC motor. In the current circulation control, one of all high-side switches and all low-side switches are turned on at the same time so that a current, which results from energy stored in the DC motor in the normal control time, flows in the DC motor in the same direction as in the normal control time.

In the conventional motor control unit described above, the current detection resistor is provided at only one side of the DC motor. It is assumed for example that the current detection resistor is provided at a location, which is a high potential side of the motor, that is, a power supply side, in the normal control under normal rotation of the DC motor. In a case that all the high-side arm switches are turned on at the same time in the current circulation control, potential references of the current detection resistor in the normal control and the current circulation control are the ground and the power supply, respectively, under reverse rotation of the DC motor. In a case that all the low-side arm switches are turned on at the same time in the current circulation control, potential references of the current detection resistor in the normal control and the current circulation control are the power supply and the ground, respectively, under normal rotation of the DC motor.

Since a power supply level varies, ranges of error in the detection value of the current detection resistor differ between cases that the references are the power supply and the ground. That is, accuracy of current detection varies. It is not possible to perform the feedback control accurately when the potential references of the current detection resistor differ between the normal control and the current circulation control under the same direction of rotation of the DC motor.

SUMMARY

It is therefore an object to provide a motor control unit, which improves accuracy of a feedback control in any of normal rotation time and reverse rotation time of a DC motor.

According to one aspect, a motor control unit is provided for controlling a current flowing in a DC motor, which has a first terminal and a second terminal. The motor control unit comprises an H-bridge circuit, a current detection part and a control part. The H-bridge circuit includes a high-side arm circuit including two high-side arm switches connected in parallel to a power supply, a low-side arm circuit including two low-side arm switches connected in parallel to a ground. One of the two high-side arm switches and one of the two low-side arm switches are connected in series at a first connection node electrically connected to the first terminal of the DC motor. The other of the two high-side arm switches and the other of the two low-side arm switches is connected in series at a second connection node electrically connected to the second terminal of the DC motor. The current detection part includes, as current detection resistors for detecting the current flowing in the DC motor, a first resistor provided between the first connection node and the first terminal and a second resistor provided between the second connection node and the second terminal. The control part feedback-controls the high-side arm switches and the low-side arm switches of the H-bridge circuit so that a detection value of the current detection part follows a target value. The control part alternately performs as feedback control a normal control for turning on one high-side switch and one low-side arm switch at same time so that the current flows from the power supply to the ground through the DC motor and for turning on one of all the high-side arm switches and all the low-side arm switches at same time so that the current flows in a same direction as in normal control time based on energy stored in the DC motor in the normal control time. The control part further turns on in the current circulation control same one of the high-side arm switch and the low-side arm switch, which is turned on, is the same in normal rotation time and reverse rotation time of the DC motor. The control part performs the feedback control based on the detection value of either one of the first resistor and the second resistor in the normal rotation time. The control part performs the feedback control based on the detection value of the other of the first resistor and the second resistor in the reverse rotation time. The control part performs the feedback control based on one of the detection values of the first resistor and the second resistor, which has a same reference potential between the normal control and the current circulation control, in the normal control and the current circulation control under same rotation direction of the DC motor.

EMBODIMENT OF THE INVENTION

A motor control unit will be described below with reference to plural embodiments shown in the drawings. In the following embodiments, functionally same or structurally corresponding parts are designated with same reference signs.

First Embodiment

A motor control unit according to a first embodiment will be described with reference to FIG. 1. The motor control unit is configured to control a current supplied to a DC motor. In the first embodiment, the motor control unit is configured to control a DC motor of an electric actuator, which regulates an open angle of a waste gate valve. The waste gate valve is configured to regulate a turbocharged pressure of a turbocharger.

Figure 1:
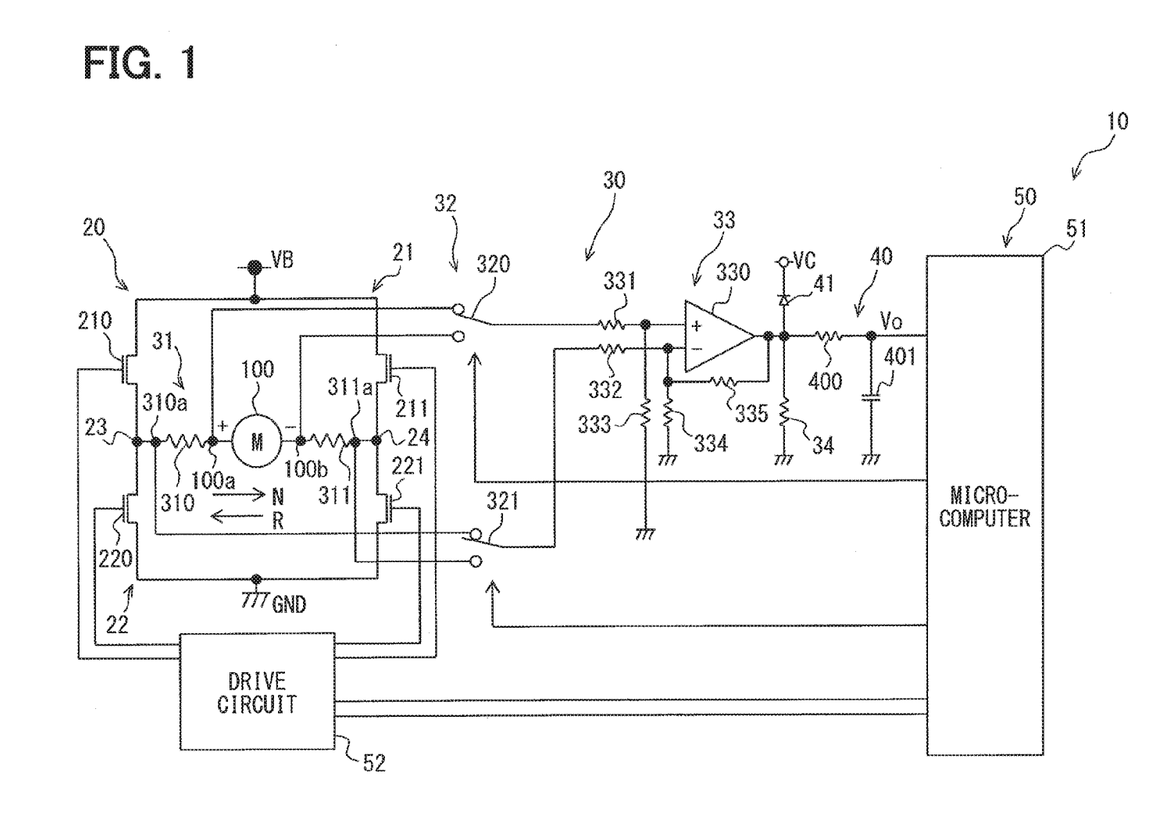
FIG. 1 is a circuit diagram showing a configuration of a motor control unit according to a first embodiment.

As shown in FIG. 1, a motor control unit 10 includes an H-bridge circuit 20, a current detection part 30 and a control part 50. The H-bridge circuit 20 includes a high-side arm circuit 21 and a low-side arm circuit 22. The high-side arm circuit 21 is formed of two high-side arm switches 210 and 211 connected in parallel relative to a power supply, which supplies a battery voltage VB (for example, 12V). The high-side arm switches 210 and 211 are provided between the power supply and a DC motor 100. The high-side arm switches 210 and 211 are referred to as high-side switches.

The low-side arm circuit 22 is formed of two low-side arm switches 220 and 221 connected in parallel relative to a ground (GND). The low-side arm switches 220 and 221 are provided between the DC motor 100 and the ground. The low-side arm switches 220 and 221 are referred to as low-side switches.

Each of the high-side arm switches 210 and 221 and the low-side arm switches 220 and 221 may be a MOSFET. In the present embodiment, it is an n-channel MOSFET. Specifically, drains of the high-side arm switches 210 and 211 are on a power supply side and sources of the low-side arm switches 220 and 211 are on a ground side. A source of the high-side arm switch 210 and a drain of the low-side arm switch 220 are electrically connected to each other. A source of the high-side arm switch 211 and a drain of the low-side arm switch 221 are electrically connected to each other.

The H-bridge circuit 20 thus includes two sets of a high-side arm and a low-side arm. One set is formed of the high-side arm switch 210 and the low-side arm switch 220 connected in series as a first set. The other set is formed of the high-side arm switch 211 and the low-side arm switch 221 connected in series as a second set. A first connection node 23 between the high-side arm and the low-side arm of the first set is connected electrically to a first terminal 100a of the DC motor 100. A second connection node 24 between the high-side arm and the low-side arm of the second set is connected electrically to a second terminal 100b of the DC motor 100. The first terminal 100a is a positive-polarity side terminal (+) and the second terminal 100b is a negative-polarity side terminal (−). A current flows in a direction from the first terminal 100a to the second terminal 100b when the DC motor 100 rotates in a normal direction N, which is a forward rotation direction. The current flows in a direction from the second terminal 100b to the first terminal 100a when the DC motor 100 rotates in a reverse direction R.

The current detection part 30 includes a current detection resistor 31, a selection switch 32, a differential amplifier 33 and an output resistor 34. The current detection resistor 31 is provided to detect a current flowing in the DC motor 100. An inter-terminal voltage of the current detection resistor 31 indicates a voltage value corresponding to a current value flowing in the DC motor 100. The current detection resistor 31 is formed of a first resistor 310 and a second resistor 311. The first resistor 310 is provided between the first connection node 23 and the first terminal 100a of the positive-polarity side of the DC motor 100. The first connection node 23 is thus connected electrically to the first terminal 100a through the first resistor 310. The second resistor 311 is provided between the second connection node 24 and the second terminal 100b of the negative-polarity side of the DC motor 100. The second connection node 24 is thus connected electrically to the second terminal 100b through the second resistor 311. In normal rotation time, the first resistor 310 is at the high-potential side of the DC motor 100 and the second resistor 311 is at the low-potential side of the DC motor 100, respectively. In reverse rotation time, the first resistor 310 is at the low-potential side of the DC motor 100 and the second resistor 311 is at the high-potential side of the DC motor 100.

The selection switch 32 selectively connects one of the first resistor 310 and the second resistor 311 to the differential amplifier 33. The selection switch 32 is formed of a first selection switch 320 and a second selection switch 321.

The first selection switch 320 selectively connects one of the first terminal 100a and the second terminal 100b of the DC motor 100 to a non-inverting input terminal of an operational amplifier 330, which will be described later, under control of a command signal from a microcomputer 51, which will be described later. That is, the first selection switch 320 selectively connects one of a motor-side terminal of the first resistor 310 and a motor-side terminal of the second resistor 311 to the non-inverting input terminal of the operational amplifier 330 under control of the command signal from the microcomputer 51.

The second selection switch 321 selectively connects one of a terminal 310a, which is the same as the first connection node 23, and a terminal 311a, which is the same as the second connection node 24, to an inverting input terminal of the operational amplifier 330 under control of the command signal from the microcomputer 51.

The differential amplifier 33 is formed of an operational amplifier 330, gain resistors 331, 332, 333, 334 and 335, which set a gain of the operational amplifier 330. The first selection switch 320 is connected electrically to the non-inverting input terminal of the operational amplifier 330. The second selection switch 321 is connected electrically to the inverting input terminal of the operational amplifier 330. An output terminal of the operational amplifier 330 is connected to the ground through the output resistor 34. Thus the output of the differential amplifier 33 is suppressed from floating in a case that the differential amplifier 33 draws in current.

The gain resistor 331 is provided between the first selection switch 320 and the non-inverting input terminal of the operational amplifier 330. The gain resistor 332 is provided between the second selection switch 321 and the inverting input terminal of the operational amplifier 330. The gain resistor 333 is provided between a node of the gain resistor 331 and the non-inverting input terminal and the ground. Accordingly, in the first embodiment, a reference voltage of the differential amplifier 330 is the ground (0V). The gain resistor 334 is provided between a node of the gain resistor 332 and the inverting input terminal and the ground. The gain resistor 335 is provided between the inverting input terminal and the output terminal of the operational amplifier 330.

The output of the operational amplifier 330 is inputted to the microcomputer 51 through a low-pass filter 40. A voltage Vo is inputted to the microcomputer 51 as the current detection value. The low-pass filter 40 is formed of a resistor 400 and a capacitor 401. One end of the resistor 400 is connected to a connection node between the output terminal of the operational amplifier 330 and the output resistor 34. The other end of the resistor 400 is connected to an input terminal of the microcomputer 51, although not shown. The capacitor 401 is provided between the other end of the resistor 400 and the ground. The output terminal of the operational amplifier 330 is connected to a power supply, which supplies a voltage VC (for example, 5V) for operation of the microcomputer 51, through a protective diode 41. Anode of the protective diode 41 is connected to the output terminal side of the operational amplifier 330 so that the output of the differential amplifier 33 (operational amplifier 330) does not exceed an AD input range of the microcomputer 51.

The control part 50 includes the microcomputer 51 and a drive circuit 52. The microcomputer 51 is formed of a CPU, a ROM, a RAM, an AD converter, an I/O port and the like. The microcomputer 51 acquires, for example, the actual turbocharged pressure and calculates the current flowing in the DC motor 100, which drives the waste gate valve, based on a difference between the target turbocharged pressure and the actual turbocharged pressure. The microcomputer 51 generates a rotation direction command for the DC motor 100 and a command current value to be supplied to in the DC motor 100. The microcomputer 51 then calculates duty ratios of PWM signals, which are to be commanded to the high-side arm switches 210, 211 and the low-side arm switches 220, 221, based on the rotation direction command and the command current value.

The microcomputer 51 further detects the current value flowing in the DC motor 100 based on the detection signal of the current detection part 30, that is, based on the voltage Vo, while the DC motor 100 is driven. The microcomputer 51 then feedback controls the duty ratio of the PWM signal based on the difference between the command current value, that is, the target current value, and the detected current value.

The drive circuit 52 generates drive signals for controlling the high-side arm switches 210, 211 and the low-side arm switches 220, 221 to turn on and off based on the PWM signal outputted from the microcomputer 51 and outputs the generated drive signals to the high-side arm switches 210, 211 and the low-side arm switches 220, 221.

Figure 2:
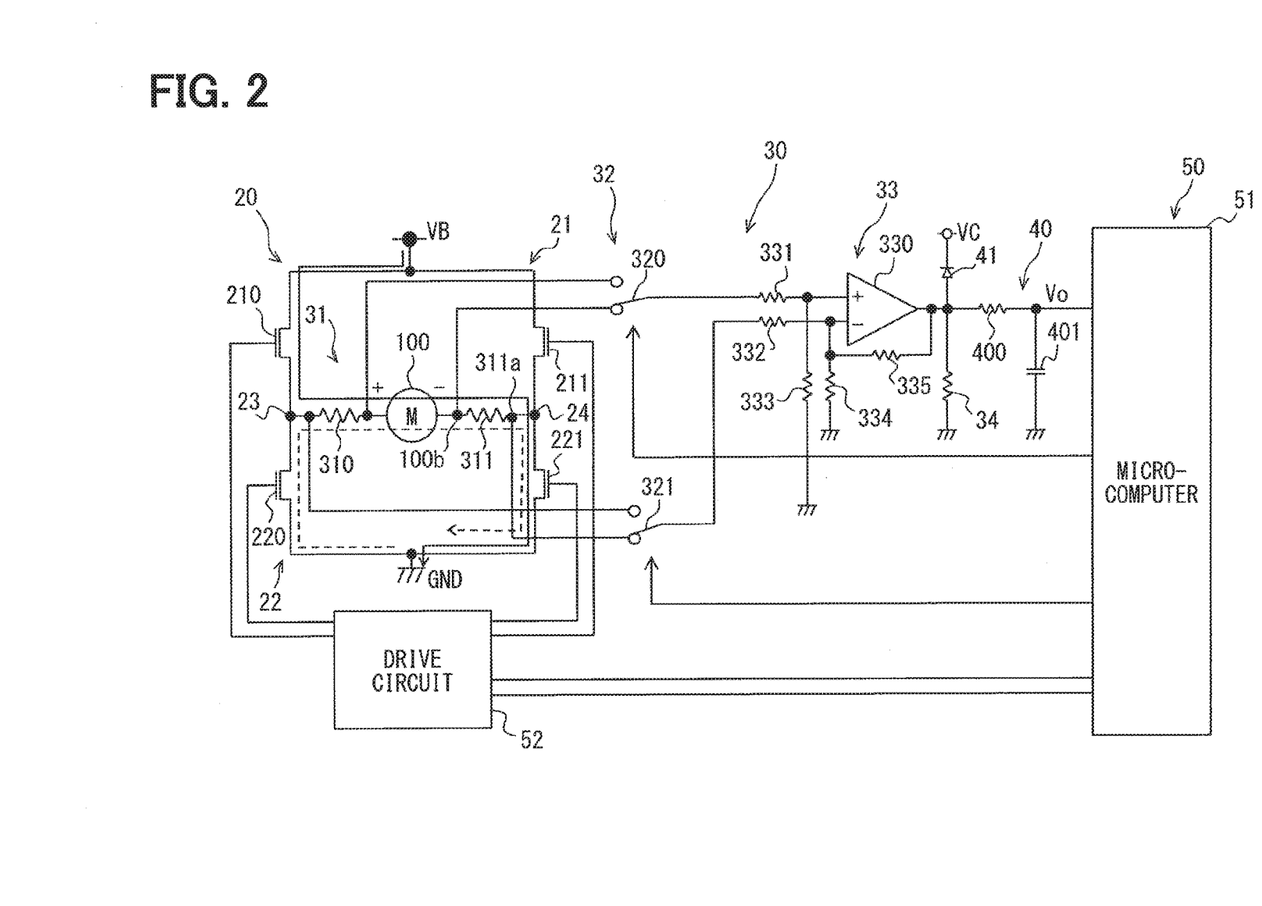
FIG. 2 is a circuit diagram showing a normal control under normal rotation time.
Figure 3:
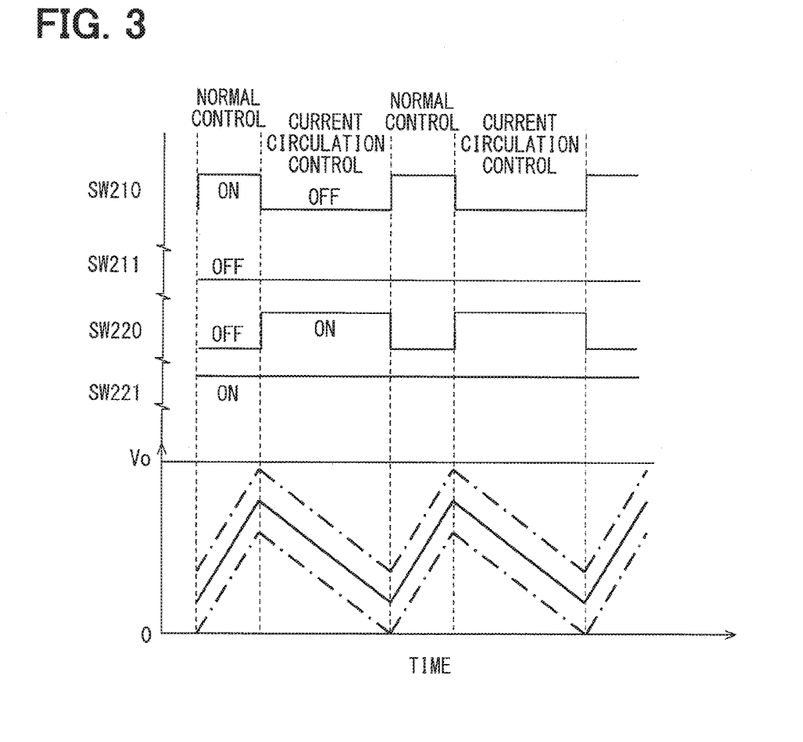
FIG. 3 is a timing chart showing a power supply pattern and changes in a voltage corresponding to a current flowing in a motor under normal rotation time.
Figure 4:
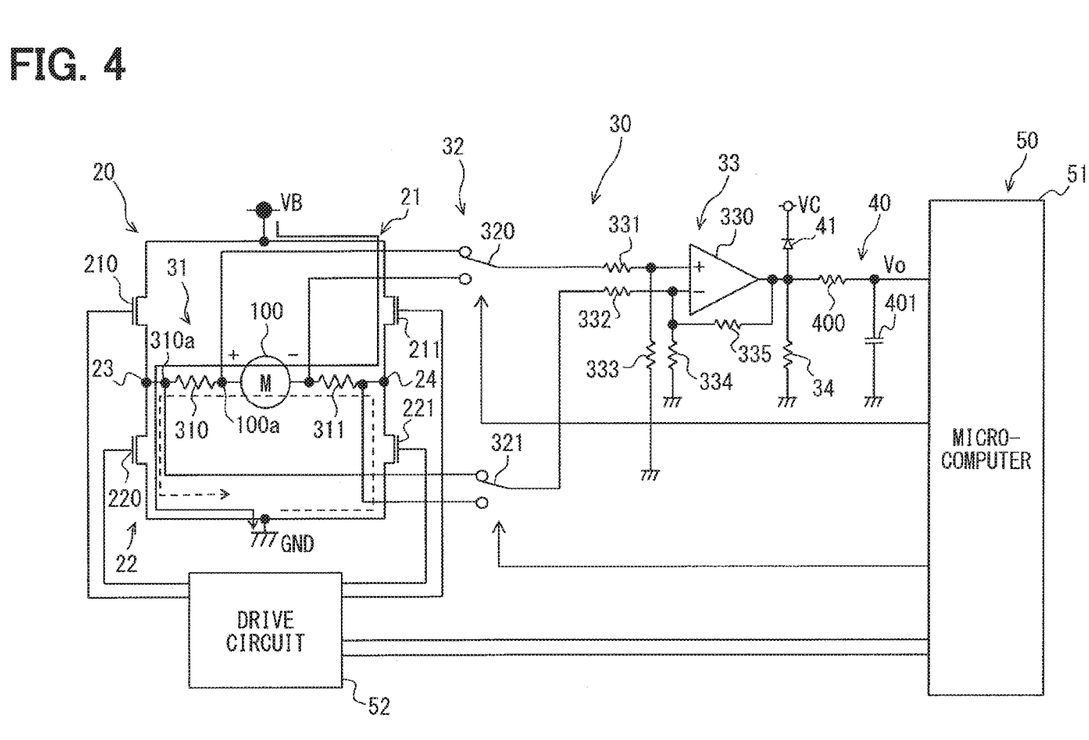
FIG. 4 is a circuit diagram showing a normal control under reverse rotation time.

The DC motor 100 is controlled to operate as shown in FIG. 2 to FIG. 4 during the normal rotation time and the reverse rotation time. In this embodiment, a low-side current circulation control is assumed. In this control, the current is circulated at a side of the low-side arm circuit 22. FIG. 2 shows a normal control state in the normal rotation time. In FIG. 2, a solid-line arrow indicates a current flow path in the normal control time. A dotted-line arrow indicates a current flow path in the current circulation control time as a reference line. FIG. 4 shows a normal control state in the reverse rotation time. In FIG. 4, a solid-line arrow indicates a current flow path in the normal control time. A dotted-line arrow indicates a current flow path in the current circulation control time as a reference line.

Control in the normal rotation time will be described first. When the DC motor 100 is to be rotated in the normal direction, the control part 50 maintains the drive signal for the low-side arm switch 221 at a H-level, that is, at a duty ratio 100%, and the drive signal for the high-side arm switch 211 at an L-level, that is, at a duty ratio 0%. That is, the control part 50 controls the low-side arm switch 221 and the high-side arm switch 211 to turn on and off, respectively. The control part 50 controls the duty ratios of the high-side arm switch 210 and the low-side arm switch 220 in accordance with the target open angle. For the high-side arm switch 210 and the low-side arm switch 220, the H-level and the L-level of the drive signals are reversed alternately. That is, the low-side arm switch 220 is controlled to turn off when the high-side arm switch 210 is controlled to turn on, and the low-side arm switch 220 is controlled to turn on when the high-side arm switch 210 is controlled to turn off.

In the normal rotation time, as shown in FIG. 2, the microcomputer 51 controls the selection switch 32 (first selection switch 320 and second selection switch 321) to electrically connect the non-inverting input terminal of the operational amplifier 330 and the second terminal 100b of the DC motor 100 and electrically connect the inverting input terminal and the terminal 311a of the second resistor 311. Thus, for current detection, the second resistor 311, which is provided at the low-potential side of the DC motor 100 relative to the direction of current flow, is selected. In the normal rotation time, the second resistor 311 is selected in any of the normal control and the current circulation control.

In the normal control time, in which the control part 50 turns on the high-side arm switch 210 and turns off the low-side arm switch 220, the current flows from the power supply VB to the ground through the high-side arm switch 210, the first resistor 310, the DC motor 100, the second resistor 311 and the low-side arm switch 221 as indicated by the solid line arrow in FIG. 2. By turning on the high-side arm switch 210 and the low-side arm switch 221 at the same time, the current flows from the power supply to the ground through the DC motor 100 in the direction for normal rotation direction of the DC motor 100. The second resistor 311 is provided at the low potential side of the DC motor 100 and connected electrically to the ground through the low-side arm switch 221, which is turned on. As a result, the reference potential of the second resistor 311 is the ground potential and the inter-terminal voltage of the second resistor 311 varies with the current flowing therethrough relative to the ground as the reference potential. In the normal control, as shown in FIG. 3, the voltage Vo of the filter part 40 increases.

In the current circulation control time, in which the control part 50 turns off the high-side arm switch 210 and turns on the low-side arm switch 220, the current flows from the ground to the ground through the low-side arm switch 220, the first resistor 310, the DC motor 100, the second resistor 311 and the low-side arm switch 221 as indicated by the dotted line arrow in FIG. 2. By turning on the low-side arm switches 220 and 221 at the same time, the current, which is generated by energy (arc extinction energy) stored in the DC motor 100 in the normal control time, flows in a closed circuit (current circulation circuit) formed at the side of the low-side arm circuit 22. That is, the current flows in the same direction through the DC motor 100 as in the normal control time, that is, from the power supply to the ground through the DC motor 100 in the direction for normal rotation direction of the DC motor 100. In the current circulation control time as well, the second resistor 311 is connected electrically to the ground. As a result, the inter-terminal voltage of the second resistor 311 varies relative to the ground as the reference potential. In the current circulation control, as shown in FIG. 3, the voltage Vo of the low-pass filter part 40 decreases.

As shown in FIG. 3, the detection current value corresponding to the voltage Vo approaches the target current value by alternately performing the normal control and the current circulation control. As described above, in the normal rotation time, the current flowing in the DC motor 100 is detected relative to the ground potential as the reference in any of the normal control and the current circulation control.

Control in the reverse rotation time will be described next. When the DC motor 100 is to be rotated in the reverse direction R, the control part 50 maintains the drive signal for the low-side arm switch 220 at the H-level, that is, at the duty ratio 100%, and the drive signal for the high-side arm switch 210 at the L-level, that is, at the duty ratio 0%. That is, the control part 50 controls the low-side arm switch 220 and the high-side arm switch 210 to turn on and off at the same time, respectively. The control part 50 controls the duty ratios of the high-side arm switch 211 and the low-side arm switch 221 in accordance with the target open angle. For the high-side arm switch 211 and the low-side arm switch 221, the H-level and the L-level of the drive signals are reversed alternately. That is, the low-side arm switch 221 is controlled to turn off when the high-side arm switch 211 is controlled to turn on, and the low-side arm switch 221 is controlled to turn on when the low-side arm switch 211 is controlled to turn off.

In the reverse rotation time, as shown in FIG. 4, the microcomputer 51 controls the selection switch 32 (first selection switch 320 and second selection switch 321) to electrically connect the non-inverting input terminal of the operational amplifier 330 and the first terminal 100a of the DC motor 100 and electrically connect the inverting input terminal and the terminal 310a of the first resistor 310. Thus, for current detection, the first resistor 310, which is provided at the low-potential side of the DC motor 100 relative to the direction of current flow, is selected. In the reverse rotation time, the first resistor 310 is selected in any of the normal control and the current circulation control.

In the current circulation control time, in which the control part 50 turns on the high-side arm switch 211 and turns off the low-side arm switch 221, the current flows from the power source to the ground through the high-side arm switch 221, the second resistor 311, the DC motor 100, the first resistor 310 and the low-side arm switch 220 as indicated by the solid line arrow in FIG. 4. By turning on the high-side arm switch 211 and the low-side arm switch 220 at the same time, the current flows from the power supply to the ground through the DC motor 100 in the direction for reverse rotation direction of the DC motor 100. The first resistor 310 is provided at the low potential side of the DC motor 100 and connected electrically to the ground through the low-side arm switch 220, which is turned on. As a result, the reference potential of the first resistor 310 is the ground potential and the inter-terminal voltage of the first resistor 310 varies relative to the ground as the reference potential. In the normal rotation control, as shown in FIG. 3, the voltage Vo increases.

In the current circulation control time, in which the control part 50 turns off the high-side arm switch 211 and turns on the low-side arm switch 221, the current flows from the ground to the ground through the low-side arm switch 221, the second resistor 311, the DC motor 100, the first resistor 310 and the low-side arm switch 220 as indicated by the dotted line arrow in FIG. 4. By turning on the low-side arm switches 220 and 221 at the same time, the current, which is generated by energy (arc extinction energy) stored in the DC motor 100 in the normal control time, flows in a closed circuit (current circulation circuit) formed at the side of the low-side arm circuit 22. That is, the current flows in the same direction as in the normal control time. In the current circulation control time as well, the first resistor 310 is connected electrically to the ground. As a result, the inter-terminal voltage of the first resistor 310 varies relative to the ground as the reference potential. In the current circulation control, the voltage Vo decreases similarly to the normal control time shown in FIG. 3.

In the reverse rotation time as well, the detection current value corresponding to the voltage Vo approaches the target current value by alternately performing the normal control and the current circulation control. As described above, in the reverse rotation time, the current flowing in the DC motor 100 is detected relative to the ground potential as the reference in any of the normal control and the current circulation control.

The motor control unit 10 according to the first embodiment provides the following advantages.

Figure 5:
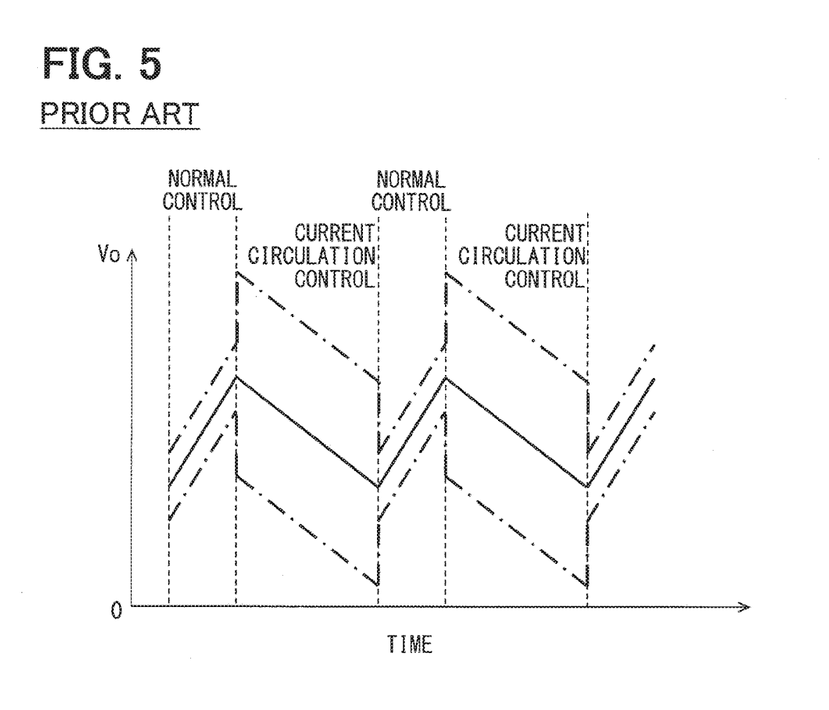
FIG. 5 is a timing chart showing a power supply pattern and changes in a voltage corresponding to a current flowing in a motor in a conventional unit.

FIG. 5 is a timing chart, which shows, as one example, the current is circulated at the high-side arm circuit side in the normal rotation time in a conventional motor device having a current detection resistor (second resistor 311 in the first embodiment) only at one end of the motor. In the normal control, the current detection resistor is provided at the low-potential side of the motor and electrically connected to the ground. In the current circulation control, the current detection resistor is electrically connected to the power supply. Thus, the current flowing in the motor is detected relative to the ground as the reference in the normal control and is detected relative to the power supply as the reference in the current circulation control. The battery voltage supplied from the power supply supplies power to plural loads and varies largely in comparison to the ground. For this reason, as shown in FIG. 5, the range of error of the voltage Vo differs between the normal control and the current circulation control. In FIG. 5, the solid line of the voltage Vo indicates a theoretical value and the one-dot chain lines above and below the theoretical value indicate an error range. The voltage Vo varies within the range indicated by the one-dot chain lines. Therefore the accuracy of current detection differs between the normal control and the current circulation control.

In the first embodiment, on the other hand, the first resistor 310 connected to the first terminal 100a of the DC motor 100 and the second resistor 311 connected to the second terminal 100b are provided as the current detection resistor 31. The control part 50 selects the second resistor 311, which is at the low-potential side of the DC motor 100, out of the first resistor 310 and the second resistor 311 in the normal control and the current circulation control during the rotation of the DC motor 100 in the normal direction. That is, the current detection resistor 31 (second resistor 311), which is electrically connected to the ground in any of the normal control and the current circulation control, is selected out of the power supply and the ground. The control part 50 detects the current, which flows in the DC motor 100, based on the inter-terminal voltage of the second resistor 311. Since the current is detected relative to the ground as the reference in any of the normal control and the current circulation control, the error range of the voltage Vo does not differ between the normal control and the current circulation control because the ground potential as the reference potential is fixed. That is, the current is detected with the same accuracy between the normal control and the current circulation control. As a result, it is possible to improve the accuracy of the feedback control in the normal rotation time in comparison to the conventional example (FIG. 5).

The control circuit 50 to selects the first resistor 310, which is provided at the low potential side of the DC motor 100, in the normal control and the current circulation control during the reverse rotation of the DC motor 100. The control circuit 50 selects the current detection resistor 31 (first resistor 310), which is electrically grounded in any of the normal control and the current circulation control, out of the power supply and the ground. The control part 50 detects the current, which flows in the DC motor 100, based on the inter-terminal voltage of the first resistor 310. Since the current is detected relative to the ground as the reference in any of the normal control and the current circulation control, the feedback control is performed with higher accuracy even in the reverse rotation time in comparison to the conventional example.

In the first embodiment, in particular, the control part 50 performs the low-side current circulation control, which turns on all of the low-side arm switches 220 and 221 at the same time. As shown in FIG. 5, the error range of the voltage Vo increases in the case of the power supply as the reference than in the case of the ground as the reference because of variation in the battery voltage. It is thus possible to improve the accuracy in current detection by using the ground as the reference. That is, it is possible to improve the accuracy of feedback control.

However, the current circulation control is not limited to the low-side current circulation control. The high-side current circulation control may be performed. In the case of the high-side current circulation control, the control part 50 selects the first resistor 310, which is at the high-potential side of the DC motor 100 in the normal rotation time. Thus, in any of the normal control and the current circulation control, the current flowing in the DC motor 100 can be detected relative to the power supply as the reference. The control part 50 selects the second resistor 311, which is at the high potential side of the DC motor 100 in the reverse rotation time. Thus, in any of the normal control and the current circulation control, the current flowing in the DC motor 100 is detected relative to the power supply as the reference. The control part 50 may thus perform, in the normal control and the current circulation control under the same rotation direction of the DC motor 100, the feedback control based on the detection value of either one of the first resistor 310 and the second resistor 311, the potential reference of which is the same between the normal control and the current circulation control.

Further, in the first embodiment, one of the inter-terminal voltage of the first resistor 310 and the inter-terminal voltage of the second resistor 311 is selected by the selection switch 32 in accordance with the rotation direction of the DC motor 100 and the selected voltage is differentially amplified by the differential amplifier 33. Since the differential amplifier 33 is used for both of the first resistor 310 and the second resistor 311, it is possible to reduce variation in accuracy of current detections between the normal rotation time and the reverse rotation time.

Second Embodiment

The motor control unit 100 according to a second embodiment is similar to that of the first embodiment in many aspects. Therefore, the second embodiment will be described with reference to differences from the first embodiment.

Figure 6:
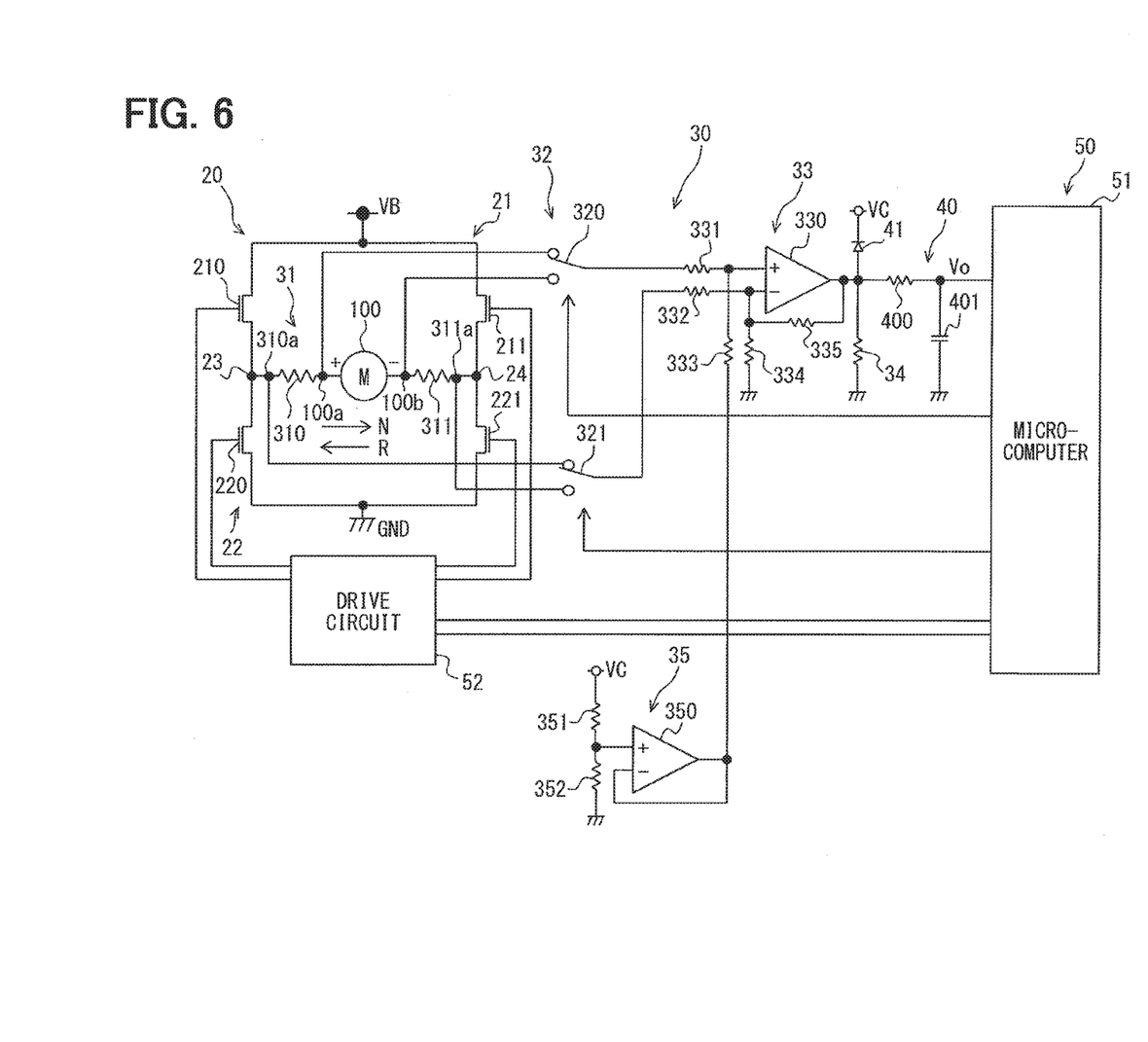
FIG. 6 is a circuit diagram of a motor control unit according to a second embodiment.

According to the second embodiment, as shown in FIG. 6, the current detection part 30 includes a reference voltage generation part 35, which generates a predetermined reference voltage higher than the ground. The reference voltage generation part 35 is formed of an operational amplifier 350 and resistors 351, 352. The resistors 351 and 352 are connected in series such that the resistor 351 is at the side of the power supply of voltage VC and the resistor 352 is at the side of the ground. An intermediate point of voltage division by the resistors 351 and 352 is connected to a non-inverting input terminal of the operational amplifier 350. A gain resistor 333 is connected to an inverting input terminal and an output terminal of the operational amplifier 350. The reference voltage generation part 35 generates, for example, 2.5V as the reference voltage.

Thus, when no current flows in the DC motor 100, the voltage Vo is 2.5V as opposed to grounding to 0V. It is thus possible to detect a rotation in a direction, which is in reverse to the rotation direction controlled by the control part 50.

Figure 7:
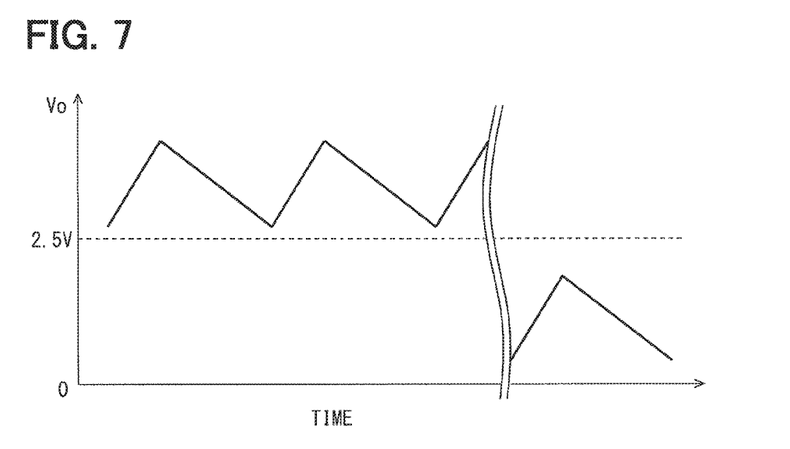
FIG. 7 is a timing chart showing a power supply pattern and changes in a voltage corresponding to a current flowing in a motor under normal rotation time.

Specifically, in the case of the electrically-driven actuator for controlling the open angle of the waste gate valve, it is likely to occur that the DC motor 100 rotates in reverse and the current flows in the direction of reverse rotation because of the turbocharged pressure causing a change in the open angle of the waste gate valve. In the second embodiment, the reference voltage of the differential amplifier 33 is set to the predetermined voltage higher than the ground (0V). As a result, when the current flows in the direction opposite to the direction intended by the control part 50, the voltage Vo indicates a voltage value lower than the reference voltage (2.5V) as shown in FIG. 7 because the current detection resistor 31 is selected for control. FIG. 7 shows one case, in which the current flows under control, at a left side of wavy lines of separation and the other case, in which the current flows in the direction opposite to the direction intended by the control, at a right side of the wavy lines of separation. FIG. 7 shows only an ideal value of the voltage Vo for convenience.

It is thus possible in the second embodiment to detect also the current, which flows in the direction opposite to the direction intended to be attained by the control.

The configuration described above is not limited to the low-side current circulation control but may be applied to the high-side current circulation control.

Third Embodiment

The motor control unit 100 according to a third embodiment is similar to that of the first embodiment in many aspects. Therefore, the third embodiment will be described with reference to differences from the first embodiment.

Figure 8:
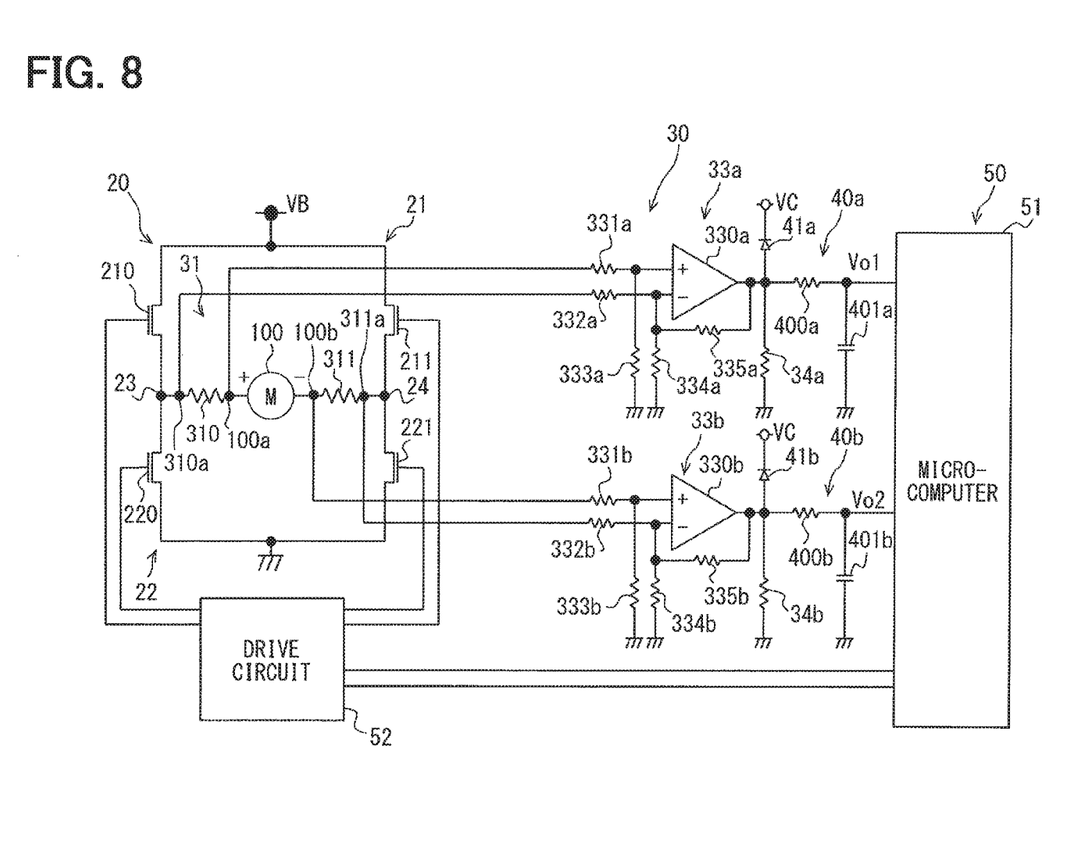
FIG. 8 is a circuit diagram of a motor control unit according to a third embodiment.

According to the third embodiment, as shown in FIG. 8, the current detection part 30 includes a first differential amplifier 33a and a second differential amplifier 33b. The first differential amplifier 33a is connected to both ends of the first resistor 310 and the second differential amplifier 33b is connected to both ends of the second resistor 311. Thus the current detection resistor 31 and the differential amplifier 33 are provided in one-to-one relation. The motor control unit 10 therefore does not include the selection switch 32, which is provided in the preceding embodiments.

Each of the first differential amplifier 33a and the second differential amplifier 33b is configured similarly to the differential amplifier 33 described in the first embodiment (shown in FIG. 1). In FIG. 8, structural elements at a side of the first differential amplifier 33a and at a side of the second differential amplifier 33b are designated with addition of "a" and "b" at the end of the reference numbers of the corresponding elements.

The first differential amplifier 33a is formed of an operational amplifier 330a, gain resistors 331a, 332a, 333a, 334a and 335a and an output resistor 34a. The first terminal 100a of the DC motor 100 is connected electrically to the non-inverting input terminal of the operational amplifier 330a through the gain resistor 331a. The terminal 310a of the first resistor 310 is connected electrically to the inverting input terminal of the operational amplifier 330a through the gain resistor 332a. The low-pass filter 40a, which includes a resistor 400a and a capacitor 401a, and a protective diode 41a are also arranged in the similar manner as in the first embodiment.

The second differential amplifier 33b is formed of an operational amplifier 330b, gain resistors 331b, 332b, 333b, 334b and 335b and an output resistor 34b. The second terminal 100b of the DC motor 100 is connected electrically to the non-inverting input terminal of the operational amplifier 330b through the gain resistor 331b. The terminal 311a of the second resistor 311 is connected electrically to the inverting input terminal of the operational amplifier 330a through the gain resistor 332b. The low-pass filter 40b, which includes a resistor 400b and a capacitor 401b, and a protective diode 41b are also arranged in the similar manner as in the first embodiment.

The microcomputer 51 of the control part 50 receives two voltages Vo1 and Vo2. The voltage Vo1 results from differential amplification of an inter-terminal voltage of the first resistor 310. The voltage Vo2 results from differential amplification of an inter-terminal voltage of the second resistor 311. The microcomputer 51 detects the current value flowing in the DC motor 100 based on the voltage Vo2 in controlling the DC motor 100 in the normal rotation direction. The microcomputer 51 detects the current value flowing in the DC motor 100 based on the voltage Vo1 in controlling the DC motor 100 in the reverse rotation direction. The microcomputer 51 thus performs feedback control based on the voltage, which corresponds to the rotation direction of the DC motor 100, out of the voltages Vo1 and Vo2.

With this configuration it is possible to perform the feedback control in any of the normal rotation and the reverse rotation by using the differential amplifiers 33a and 33b, which have the same configuration. Thus, the selection switch 32 need not be added newly and the microcomputer 51 need not output a command signal for switching over the selection switch 32 in correspondence to the ration direction.

In a case that reference voltages of the first differential amplifier 33a and the second differential amplifier 33b are the ground, the voltage Vo2 at the second differential amplifier 33b side is 0V in the reverse rotation time and the voltage Vo1 at the first differential amplifier 33a side is 0V in the normal rotation time.

The configuration described above is not limited to the low-side current circulation control but may be applied to the high-side current circulation control. The reference voltage generation part 35 provided in the second embodiment is combined to the third embodiment.

The motor control unit 100 is not limited to the embodiments described above but may be modified further.

For example, although the motor control unit 10, which is exemplified to control the electrically-driven actuator (motor 100) for regulating the open angle of the waste gate valve. However, it may be implemented in other cases. As one example, the motor control unit 10 may be implemented to control the electrically-driven actuator (DC motor) for regulating an open angle of a throttle valve in a vehicle.

What is claimed is:

1. A motor control unit for controlling a current flowing in a DC motor, which has a first terminal and a second terminal, the motor control unit comprising:
    an H-bridge circuit including a high-side arm circuit including two high-side arm switches connected in parallel to a power supply, a low-side arm circuit including two low-side arm switches connected in parallel to a ground, one of the two high-side arm switches and one of the two low-side arm switches being connected in series at a first connection node electrically connected to the first terminal of the DC motor, the other of the two high-side arm switches and the other of the two low-side arm switches being connected in series at a second connection node electrically connected to the second terminal of the DC motor;
    a current detection part including, as current detection resistors for detecting the current flowing in the DC motor, a first resistor provided between the first connection node and the first terminal and a second resistor provided between the second connection node and the second terminal; and
    a control part for feedback-controlling the high-side arm switches and the low-side arm switches of the H-bridge circuit so that a detection value of the current detection part follows a target value, the control part alternately performing as feedback control a normal control for turning on one high-side switch and one low-side arm switch at same time so that the current flows from the power supply to the ground through the DC motor and a current circulation control for turning on one of a) all the high-side arm switches and b) all the low-side arm switches at same time so that the current flows in a same direction as in a normal control time based on energy stored in the DC motor in the normal control time,
    wherein the control part performs the feedback control based on the detection value of one of the first resistor and the second resistor in a forward rotation time, the control part performs the feedback control based on the detection value of the other of the first resistor and the second resistor in a reverse rotation time, and the control part performs the feedback control based on one of the detection values of the first resistor and the second resistor that has a same reference potential in the normal control and the current circulation control under a same rotation direction of the DC motor, the current detection part includes a differential amplifier, which is common to the first resistor and the second resistor, and a selection switch for selectively connecting one of the first resistor and the second resistor and the differential amplifier; and the control part controls the selection switch in correspondence to the rotation direction of the motor.

2. The motor control unit according to claim 1, wherein the control part turns on all the low-side arm switches at same time in the current circulation time and performs the feedback control based on the detection value of the current detection resistor, which is at a low-potential side of the DC motor.

3. The motor control unit according to claim 1, wherein:
the current detection part includes a reference voltage generation part for generating a predetermined reference voltage higher than the ground; and
the differential amplifier is connected to the reference voltage generation part.

* * * * *